US012343848B2

(12) United States Patent
Hurst

(10) Patent No.: US 12,343,848 B2
(45) Date of Patent: Jul. 1, 2025

(54) PITTSBURGH LOCK SEAM OPENING TOOL AND METHOD

(71) Applicant: Hurst Sheet Metal, LLC, Lapeer, MI (US)

(72) Inventor: Ronnie Hurst, Lapeer, MI (US)

(73) Assignee: Hurst Sheet Metal, LLC, Lapeer, MI (US)

( * ) Notice: Subject to any disclaimer, the term of this patent is extended or adjusted under 35 U.S.C. 154(b) by 0 days.

(21) Appl. No.: 18/313,408

(22) Filed: May 8, 2023

(65) Prior Publication Data

US 2024/0375255 A1 Nov. 14, 2024

(51) Int. Cl.
*B25B 27/02* (2006.01)
*B21D 39/02* (2006.01)

(52) U.S. Cl.
CPC ............ *B25B 27/02* (2013.01); *B21D 39/025* (2013.01)

(58) Field of Classification Search
CPC .............................. B25B 28/00; B21D 39/025
USPC ......................................................... 29/426.5
See application file for complete search history.

(56) References Cited

U.S. PATENT DOCUMENTS

| | | | | |
|---|---|---|---|---|
| 859,838 | A | 7/1907 | Powers et al. | |
| 2,146,659 | A | 2/1939 | Stewert | |
| 2,334,407 | A | 11/1943 | Grebe | |
| 2,479,200 | A | 8/1949 | Birks | |
| 2,698,641 | A * | 1/1955 | Grebe | B21D 51/38 72/701 |
| 3,188,843 | A * | 6/1965 | Romano | B21D 31/00 72/466 |
| 3,630,160 | A * | 12/1971 | Perkins, Jr. | E04D 15/04 29/239 |
| 4,614,102 | A | 9/1986 | Kaar | |
| 7,058,291 | B2 * | 6/2006 | Weaver | H02K 7/083 318/720 |
| 8,424,361 | B1 * | 4/2013 | Evans | B25B 27/02 81/3.4 |
| 2012/0055219 | A1 | 3/2012 | Cooke | |
| 2018/0141103 | A1 | 5/2018 | Holmstock | |
| 2020/0230685 | A1 | 7/2020 | Bellise et al. | |

OTHER PUBLICATIONS

International Search Report & Written Opinion for Application No. PCT/US2024/027138; mailed Sep. 18, 2024; 10 pp.

* cited by examiner

*Primary Examiner* — Jason L Vaughan
(74) *Attorney, Agent, or Firm* — Bodman PLC

(57) ABSTRACT

A tool system including a tool and a powered driver, and the associated method of operation is provided for opening a Pittsburgh lock seam channel formed in a work piece, such as a ductwork component, or otherwise for separating folded sheet material layers. The tool includes a rotatable spreader wheel and a fixed guide respectively supported on a frame in a common plane. The powered driver can rotate the spreader wheel within the lock seam channel or between sheet material layers, separating the adjacent layers and advancing along a length of the work piece.

19 Claims, 6 Drawing Sheets

PITTSBURGH LOCK SEAM OPENING TOOL AND METHOD

TECHNICAL FIELD

The present disclosure relates generally to tools for sheet metal forming and more specifically to a mobile tool system for opening Pittsburgh lock seam channels as used in air ducts, piping, roofing or other applications.

BACKGROUND

A duct system may be employed in heating, ventilation, and air conditioning (HVAC) systems to deliver, remove, or otherwise transport air to ensure acceptable indoor air quality and comfort. A duct system may be a specially tailored system to a particular building or implementation that requires fabrication of individual components to meet a design duct design. Components may commonly be formed of galvanized steel or aluminum sheet material into hollow conduits, such as having round or rectangular cross-sections. Robust component fabrication and assembly can have an impact on HVAC system performance and efficiency. Air leaks may lead to heating or cooling energy being lost from the system to the environment or in areas of a building not intended to be heated or cooled. Additionally, air leakage may allow the entry of pollutants, allergens, debris or other impurities into the air supply for a building's living space.

One common means of joining or forming ductwork components utilizes a Pittsburgh lock seam. The Pittsburgh lock seam is a type of joint formed as an elongated pocket or channel along a first edge of a ductwork component, into which a second edge is inserted. The second edge may be of a second ductwork component to join the first component to the second component. Alternatives, the second edge may be an opposite edge of the first component to form a hollow conduit. Depending on the method and equipment used to form the channel, any post forming processing, and further subject to any storage or handling conditions, the metal folds that define the lock seam channel may be forced so tightly closed that corrective action must be taken to open the lock seam channel before it can permit entry of a cooperating edge portion.

Prior solutions to this challenge have employed large machinery used to reform the lock channel, rotary tools that were difficult to use or provided inconsistent performance, or manual prying tools that required significant manual effort and were slow to progress through a work piece. Thus, there is a need for a mobile tool system for opening Pittsburgh lock seam channels that provides consistent performance, minimal effort and high operational velocity compared to other manual solutions.

SUMMARY

This disclosure provides a tool for opening a Pittsburgh lock seam channel formed in a ductwork component. The tool includes a frame, a spreader wheel supported on the frame for rotation relative thereto. The spreader wheel is coupled to a shaft for imparting rotational motion to the spreader wheel. The spreader wheel has a peripheral edge. The tool includes a guide fixedly supported on the frame. The guide is spaced apart from the spreader wheel and guide has a retaining edge. The retaining edge of the guide is co-planar with the peripheral edge of the spreader wheel.

In one aspect, the tool may include a handle extending from the frame. The frame may include a plate with a first aperture formed as a through hole in the plate, where the shaft extends through the plate. The tool may include a shaft retainer retaining the shaft in the first aperture. The first aperture may have a first diameter, and the shaft may have a second diameter, where the second dimeter is smaller than the first diameter. The shaft may include a shoulder portion, the shoulder portion may have a third diameter where the third diameter is greater than the first diameter. The shoulder portion may have a height maintaining a separating distance between the peripheral edge of the spreader wheel and the frame. The shaft retainer may be disposed on the shaft at a distance from the shoulder, wherein the distance between the shoulder and the shaft retainer along the length of the shaft is greater than the thickness of the plate forming the frame.

The guide of the tool may be a guide wheel, where the retaining edge is an outer periphery of the guide wheel. The outer periphery of the guide wheel may be spaced from the frame at a distance equal to the height of the shoulder portion of the shaft. The outer periphery of the guide wheel may include a hardened material. The outer periphery of the guide wheel may include a material having a Rockwell hardness value greater than 70 HRB.

The tool may include a guard supported on the frame for rotation relative to the frame. The guide may be positionable to extend over the spreader wheel opposite the frame.

One aspect of the present disclosure provides a tool system including a tool and a powered driver for opening a Pittsburgh lock seam channel formed in a ductwork component. The tool of the tool system includes a frame, a spreader wheel supported on the frame for rotation relative thereto. The spreader wheel is coupled to a shaft for imparting rotational motion to the spreader wheel. The spreader wheel has a peripheral edge. The tool includes a guide fixedly supported on the frame. The guide is spaced apart from the spreader wheel and guide has a retaining edge. The retaining edge of the guide is co-planar with the peripheral edge of the spreader wheel. The tool may include a handle extending from the frame. The frame may include a plate with a first aperture formed as a through hole in the plate, where the shaft extends through the plate. The tool may include a shaft retainer retaining the shaft in the first aperture. The first aperture may have a first diameter, and the shaft may have a second diameter, where the second dimeter is small than the first diameter. The shaft may include a shoulder portion, the shoulder portion may have a third diameter where the third diameter is greater than the first diameter. The shoulder portion may have a height maintaining a separating distance between the peripheral edge of the spreader wheel and the frame. The shaft retainer may be disposed on the shaft at a distance from the shoulder, wherein the distance between the shoulder and the shaft retainer along the length of the shaft is greater than the thickness of the plate forming the frame.

The guide of the tool may be a guide wheel, where the retaining edge is an outer periphery of the guide wheel. The outer periphery of the guide wheel may be spaced from the frame at a distance equal to the height of the shoulder portion of the shaft. The outer periphery of the guide wheel may include a hardened material. The outer periphery of the guide wheel may include a material having a Rockwell hardness value greater than 70 HRB.

The tool may include a guard supported on the frame for rotation relative to the frame. The guide may be positionable to extend over the spreader wheel opposite the frame.

The powered driver may include a chuck for removably coupling the motor to the spreader wheel. The powered driver may include a battery, where the battery is in electronic communication with the motor. The powered driver may include a variable speed controller for controlling the speed of the spreader wheel.

Another aspect of the present disclosure provides a method of operating a tool for opening a Pittsburgh lock seam channel formed in a ductwork component. The Pittsburgh lock seam channel has a mouth at a first end and a base opposite the mount. The method is using a tool having a frame, a spreader wheel supported on the frame for rotation relative thereto. The spreader wheel is coupled to a shaft for imparting rotational motion to the spreader wheel. The spreader wheel has a peripheral edge. A guide is supported on the frame spaced apart from the spreader wheel. The guide has a retaining edge. The retaining edge is co-planar with the peripheral edge of the spreader wheel. The method includes placing the peripheral edge of the spreader wheel in contact with a Pittsburgh lock seam channel mount. The method include rotating the frame relative to the Pittsburgh lock seam channel to engage the retaining edge against the Pittsburgh lock seam channel base. The method includes applying rotation to the shaft coupled to the spreader wheel, and advancing the tool along the Pittsburgh lock seam channel.

The method for opening a Pittsburgh lock seam channel may include the operation of rotation of the frame aligning the spreader wheel to the Pittsburgh lock seam channel and draws the spreader wheel into the Pittsburgh lock seam channel. The method may include coupling the shaft of the spreader wheel to a motor, and wherein the operation of applying rotation to the shaft includes selectively operating the motor to induce rotation of the drive shaft. The step of operating the motor may include pulling a trigger of a portable powered driver, where the trigger is in electronic communication with variable speed controller in further electronic communication with the motor and a battery. The step of rotating the frame relative to the Pittsburgh lock seam channel may include using a handle extending from the frame of the tool to rotate the frame about the shaft. The step of advancing the tool along the lock seam channel may include sliding the guide along a base of the lock seam channel where the guide is fixedly supported on the frame.

Each of the above independent aspects of the present disclosure, and those aspects described in the detailed description below, may include any of the features, options, and possibilities set out in the present disclosure and figures, including those under the other independent aspects, and may also include any combination of any of the features, options, and possibilities set out in the present disclosure and figures.

The details of one or more implementations of the disclosure are set forth in the accompanying drawings and the description below. Other aspects, advantages, purposes, and features will be apparent upon review of the following specification in conjunction with the drawings.

BRIEF DESCRIPTION OF THE DRAWINGS

Like reference numerals indicate like parts throughout the drawings.

DETAILED DESCRIPTION

A tool for metal work is disclosed herein in various implementations for use in opening a Pittsburgh lock seam channel of a work piece, for example, a work piece formed as sheet metal ductwork component. A tool of the present disclosure may be employed in a tool system in combination with a powered driver for opening the Pittsburgh lock seam channel running along a length of the work piece. A method for operating a tool in opening a Pittsburgh lock seam channel is also provided. The tool, system and method may also be employed in other areas or applications where separating close layers of a sheet-type material is necessary.

Figure 1:
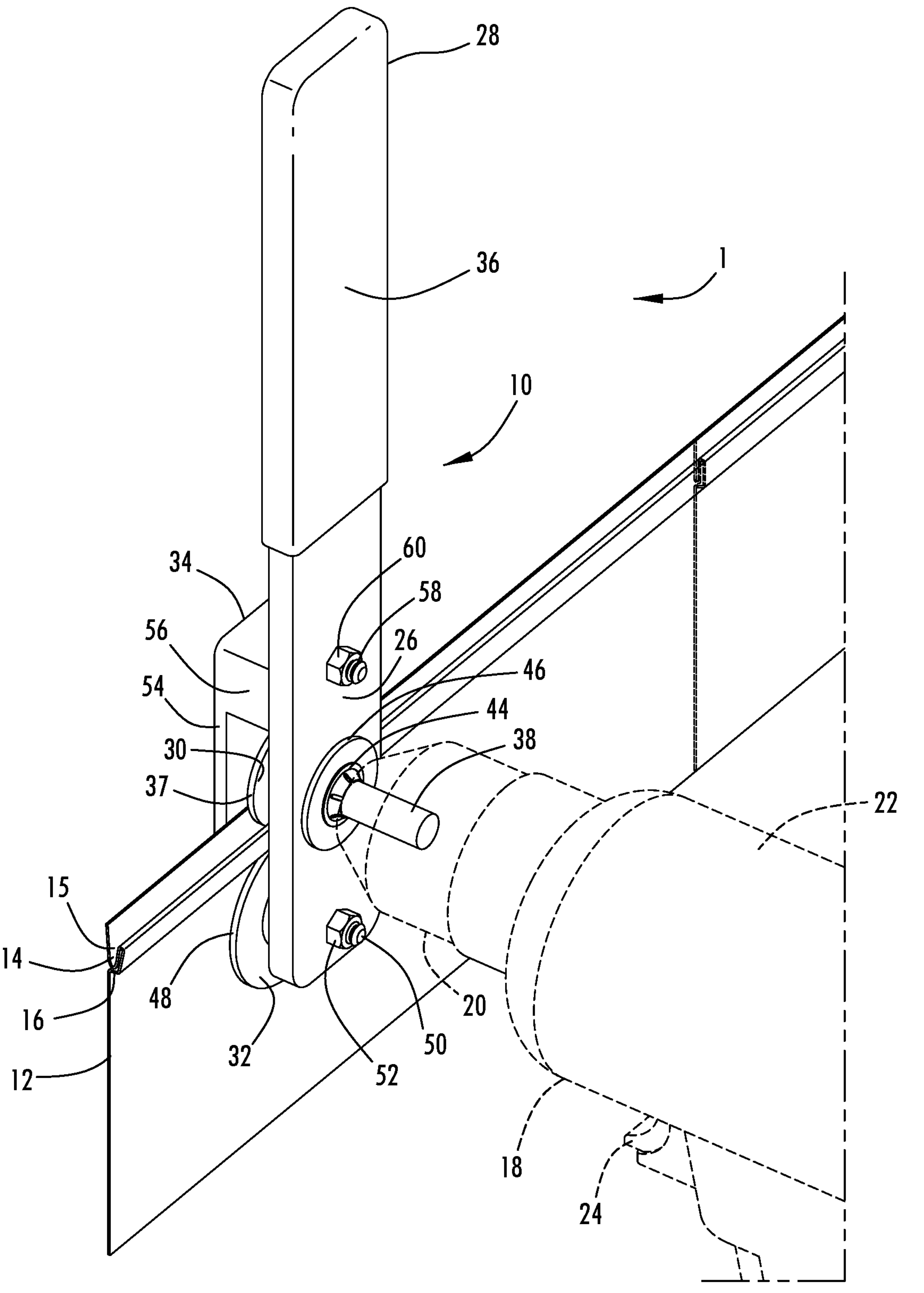
FIG. 1 is a perspective view of a tool of the present disclosure engaging a work piece having a Pittsburgh lock seam channel.

Referring to FIG. 1, a tool system 1 including a tool 10 and a powered driver 18 is illustrated in engagement with a work piece 12. The work piece 12 is illustrated as a ductwork component formed of sheet metal. More specifically, the tool 10 engages with a Pittsburgh lock seam channel 14 formed in the work piece 12. The Pittsburgh lock seam channel 14 includes a mouth 15 and a base 16. The tool 10 illustrated in FIG. 1 is coupled to a powered driver 18, such as a battery-powered drill/driver having a chuck 20 for removably receiving and securely retaining a tool shaft and a variable speed motor 22 controllable by a user through a trigger 24. The powered driver 18 may include a motor 22 in electronic communication with a power source. The power source may be a removable and/or rechargeable battery. The trigger 24 may be in electronic communication with a controller, such as a variable speed controller in further electronic communication with the motor for controlling the motor at a variable speed. The tool 10 is illustrated in a first exemplary implementation in FIGS. 2-4, and the operation of the tool 10 in engagement with a work piece 12 is illustrated in FIGS. 5-7A, and is described in detail in the accompanying discussion below.

Figure 2:
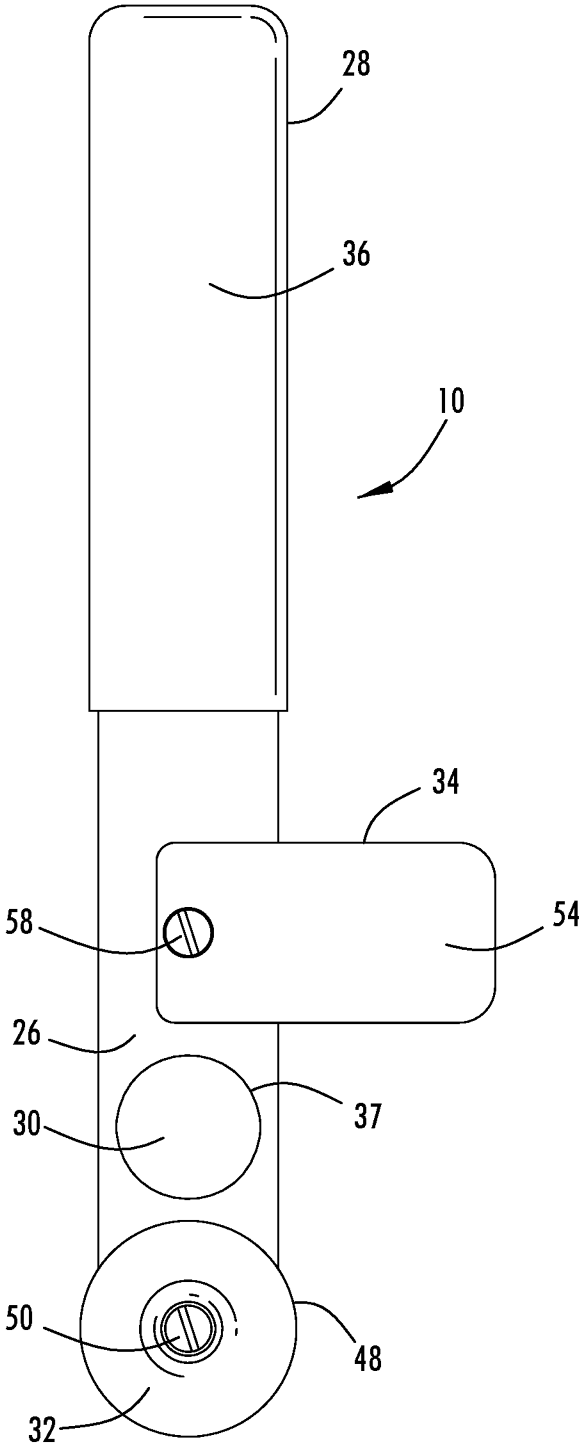
FIG. 2 is a front view of the tool of the present disclosure in a first configuration.
Figure 3:
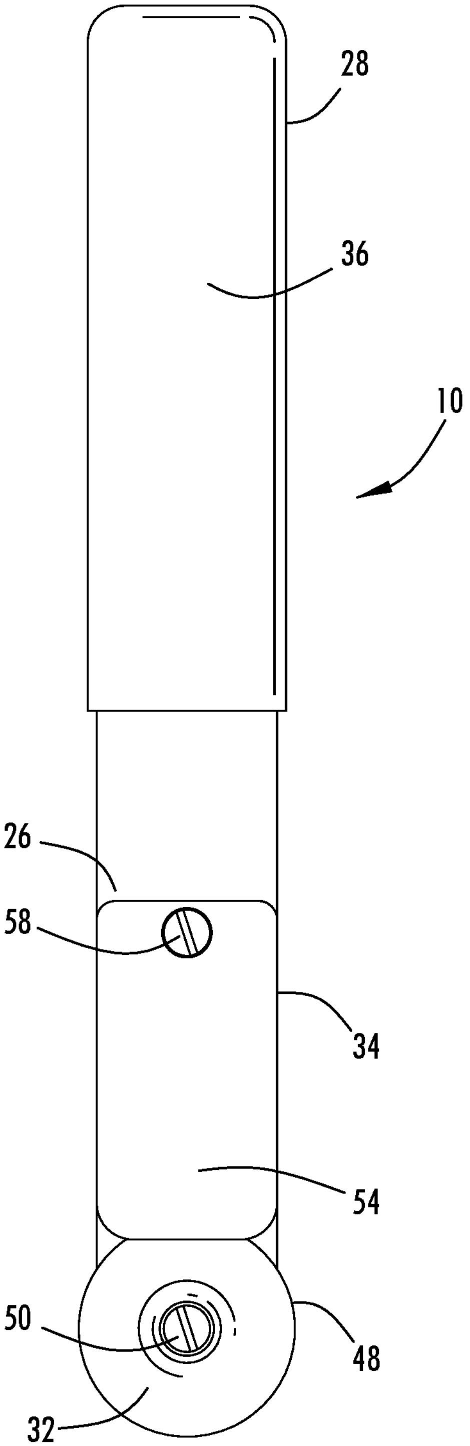
FIG. 3 is a front view of the tool of the present disclosure in a second configuration.
Figure 4:
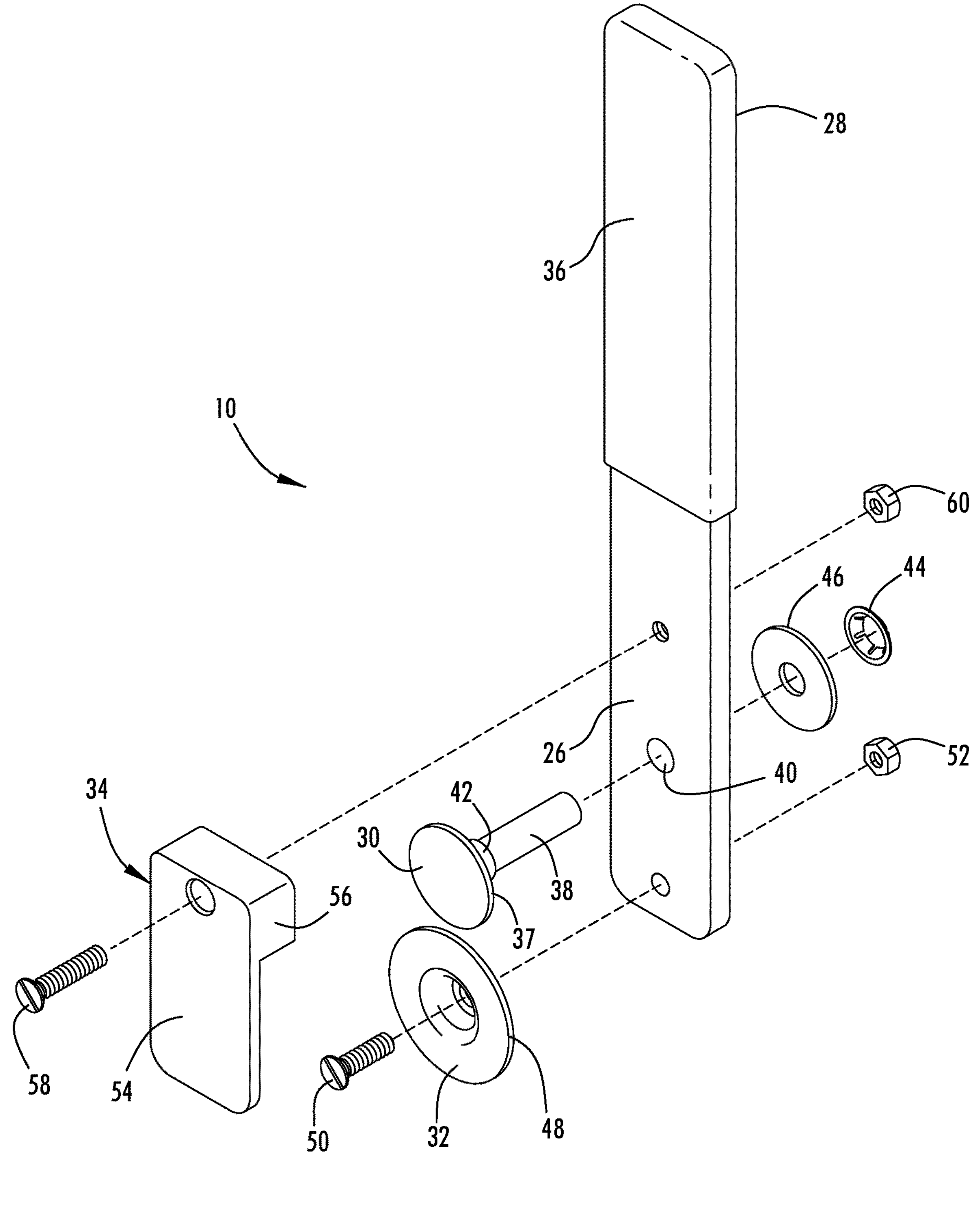
FIG. 4 is an exploded assembly view of the tool of the present disclosure.

Referring now to FIGS. 2-4, the tool 10 comprises a frame 26. The frame 26 may be formed of a metal plate or other suitable rigid material, such as a plastic material, a fiber-reinforced polymer, or the like. The tool includes a handle 28, a spreader wheel 30 and a guide 32 supported on the frame in a rigid defined relationship for performing the lock seam opening operation. The handle 28 allows a user to manipulate the tool during the lock seam opening operation. The spreader wheel 30 inserts into the mouth 15 of the lock seam channel 14 to separate crushed side walls of the lock seam channel 14 and create a wider opening along the length of the lock seam channel 14. The guide 32 engages against the base 16 of the lock seam channel 14 to maintain the spreader wheel 30 at a consistent depth in the lock seam channel 14 and retain the tool 10 in position relative to the work piece 12 during operation. The tool may optionally include a guard 34 to shroud and protect the spreader wheel 30 while in use.

The handle 28 is illustrated being formed integrally with the frame 26, but this is not intended to be limiting. In other example implementations, the handle 28 can be formed separately from the frame 26 and attached through various mechanical means, such as by welding, fasteners such as bolts or rivets, or other suitable means. The handle 28 may be disposed in the plane of the frame 26 as illustrated but this is not intended to be limiting. In other example implementations, the handle 28 may be disposed at an angle to the frame 26, such as a 45° or a 90° angle, to change the ergonomics of the tool 10 or to provide different visibility of the spreader wheel 30 during operation of the tool 10. The handle 28 may be formed of the same material as the frame 26 or may be formed of a different material. The handle 28 may include a grip 36 disposed on the handle 28, such as a rubberized coating, wrapping or other surface modification to change the size, texture, or feel of the handle 28. In one example, the grip 36 may include a stippling, knurling, or other texturing formed into the surface of the handle 28.

The spreader wheel 30 is mounted to the frame 26 for rotational movement relative to the frame 26. The spreader wheel 30 includes a peripheral edge 37 having a thickness to define the desired opening width of the lock seam channel 14. The spreader wheel 30 may be mounted to the frame 26 via a shaft 38 rigidly mounted to the spreader wheel 30. The shaft 38 may extend through the frame 26 via an aperture 40 formed as a through-hole through the frame 26. The aperture 40 may have a first diameter sized greater than the shaft 38 having a second diameter to ensure a clearance fit between the aperture 40 and the shaft 38. The shaft 38 may include a portion having a larger diameter than the aperture 40, the larger portion best seen illustrated in FIGS. 4 and 7 as a shoulder 42 having a height H that maintains a separation distance between the spreader wheel 30 and the frame 26 to ensure the frame 26 does not contact or interfere with the work piece 12 during operation.

The shaft 38 may be retained to the frame 26 by a shaft retainer, such as a self-locking retaining ring 44. There may be one or more washers 46, bearing, bushings, spacers or other components disposed on the shaft 38 between the should 42, the frame 26, and the retaining ring 44 to facilitate the smooth rotation of the spreader wheel 30 relative to the frame 26. The retaining ring 44 may be spaced from the shoulder 42 a greater distance than the thickness of the frame 26, and any washers 46 if present, to ensure a clearance fit with the frame and prevent the shaft 38 from binding in the aperture 40. The retaining ring 44 may be positioned to allow the spreader wheel 30 to move toward and away from the frame 26 by a small amount, such as between about 1 millimeter to about 5 millimeters, or more specifically between about 1 millimeter to about 2 millimeters, to permit the spreader wheel 30 to align with the guide 32 and accommodate different lock seam channel geometries.

The guide 32 may be spaced apart from the spreader wheel 30 along the frame 26 and include a retaining edge 48 to engage a base of the lock seam channel and retain the tool 10 in place relative to the work piece during operation. The guide 32 may be a guide wheel where the retaining edge 48 is an outer periphery of the guide wheel, but this is not intended to be limiting and other forms of guide 32 may be employed. The guide 32 may be implemented where the retaining edge includes a material having a high hardness to resist wear when sliding along the base 16 of the lock seam channel 14. For example, the retaining edge 48 may comprise a material having a Rockwell hardness value greater than 70 HRB. Where the guide 32 is implemented as a guide wheel, the outer periphery may be formed of a material having a Rockwell hardness value greater than 70 HRB. Where the guide 32 is implemented as a guide wheel the retention of the guide wheel can be loosened and the guide wheel rotated to a new rotational position after a period of use to counteract the effect of wear on the retention edge and ensure that the separation distance between the guide 32 and spreader wheel 30 remains constant and effective at retaining the spreader wheel 30 in the lock seam channel 14 during operation.

The guide 32 may be rigidly supported on the frame 26 in a way that prevents movement of the guide 32 relative to the frame 26. The retaining edge 48 slides along the base 16 of the lock seam channel 14 during the lock seam channel opening operation of the tool 10. The guide 32, whether implemented as a guide wheel, or otherwise, is positioned so that the retaining edge 48 is aligned in a common plane with the peripheral edge 37 of the spreader wheel 30. This alignment between the guide 32 and the spreader wheel 30 works to retain the spreader wheel 30 in the lock seam channel 14 at a consistent depth to properly open the lock seam channel 14. The guide 32 may be retained to the frame 26 via threaded fasteners 50, 52, or by other similar means. The guide 32 may be formed integrally to stand the retaining edge 48 away from the frame 26, or the guide 32 may be formed separately and a standoff or spacer may be employed to dispose the guide 32 in alignment with the spreader wheel 30. The guide 32 may be mounted to the frame 26 so that the retaining edge 48 is spaced from the frame 26 by a distance equal to the height H of the shoulder 42.

The tool 10 may optionally be provided with a guard 34 to shroud and protect the spreader wheel 30 while in use. The guard 34 may be formed of a metal or other rigid material and may be supported to freely rotate relative to the frame 26. In one example implementation, the guard 34 may be substantially L-shaped with a plate portion 54 and a base portion 56. The guard 34 may be supported to the frame 26 with threaded fasteners 58, 60 or other suitable means. While in use, the tool 10 may be oriented substantially vertically and the weight of the guard 34 may be urged by gravity to rotate into a position to enclose the area of the spreader wheel 30. The guard 34 may act to prevent objects from getting close to the spreader wheel 30 while in use and obstructing the path or progress of the tool. The guard 34 may also pivot out of the way where the geometry of the work piece 12 has an additional flange or extension adjacent the lock seam channel 14. Where the work piece 12 is deformed or has a more complex geometry the guard 34 may assist in guiding the tool 10 along the lock seam channel 14.

Figure 5:
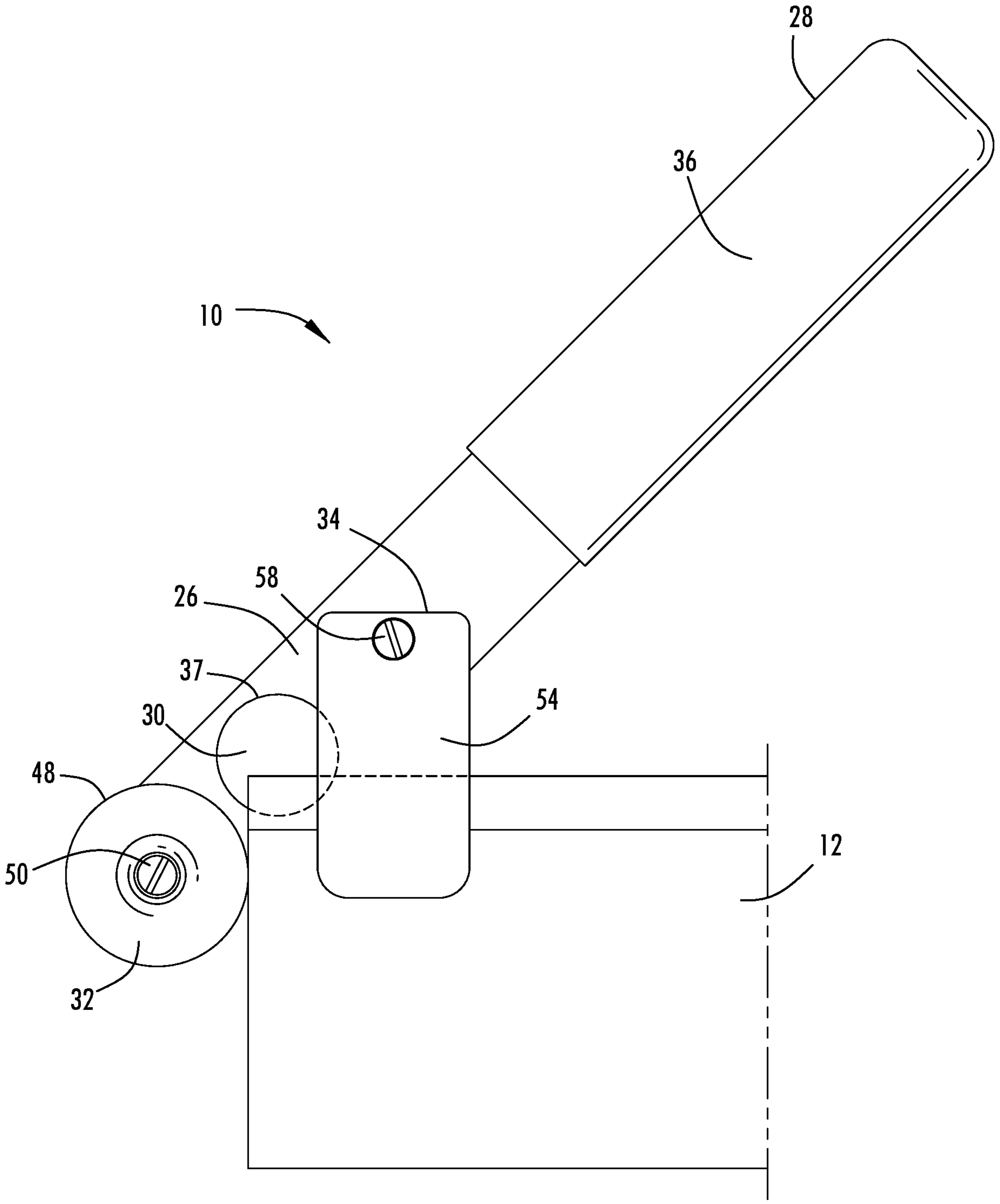
FIG. 5 is a front view of the tool of the present disclosure in a first stage of engagement with a work piece including a Pittsburgh lock seam channel.
Figure 6:
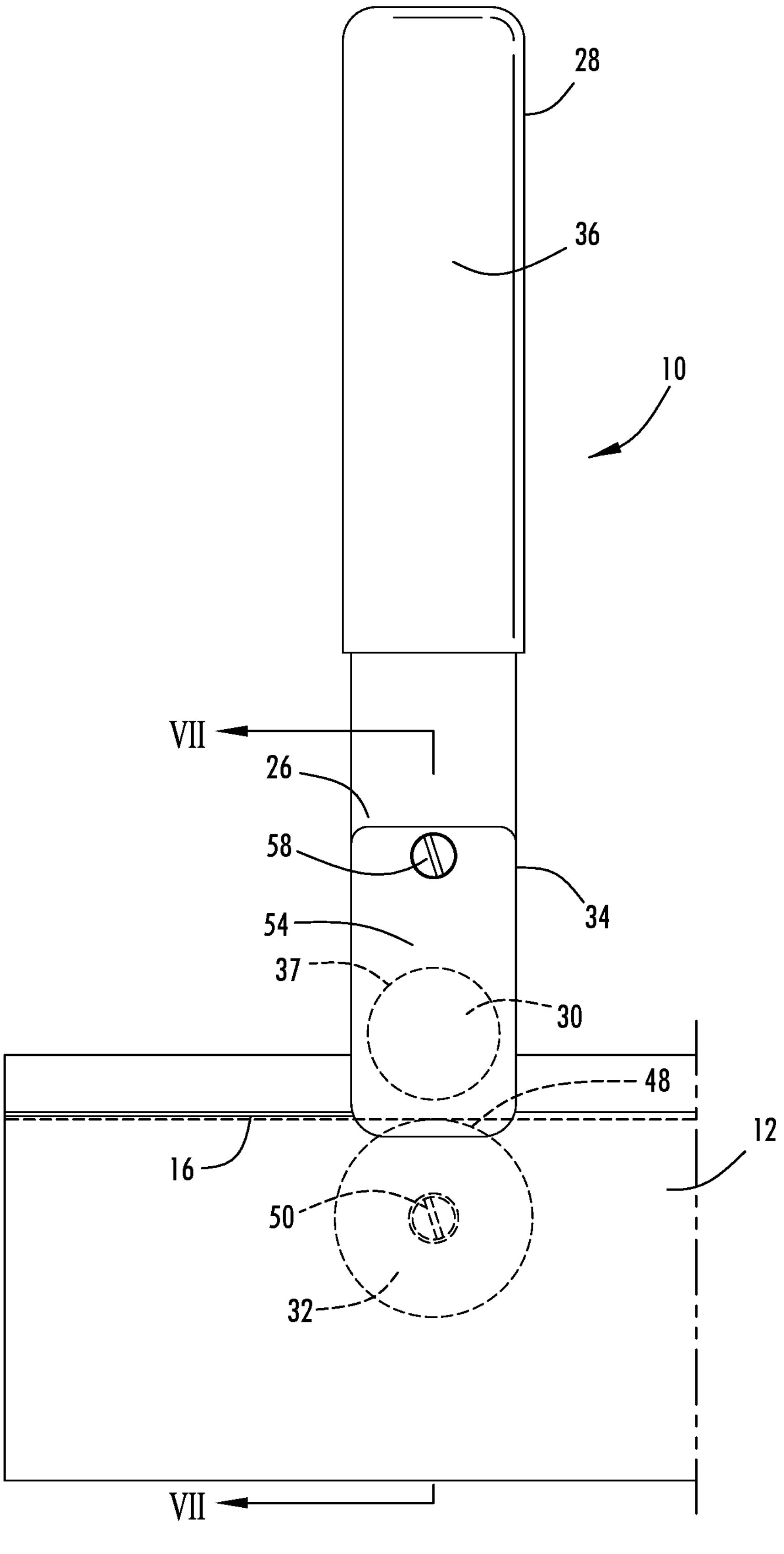
FIG. 6 is a front view of the tool of the present disclosure in a second stage of engagement with a work piece including a Pittsburgh lock seam channel.
Figure 7:
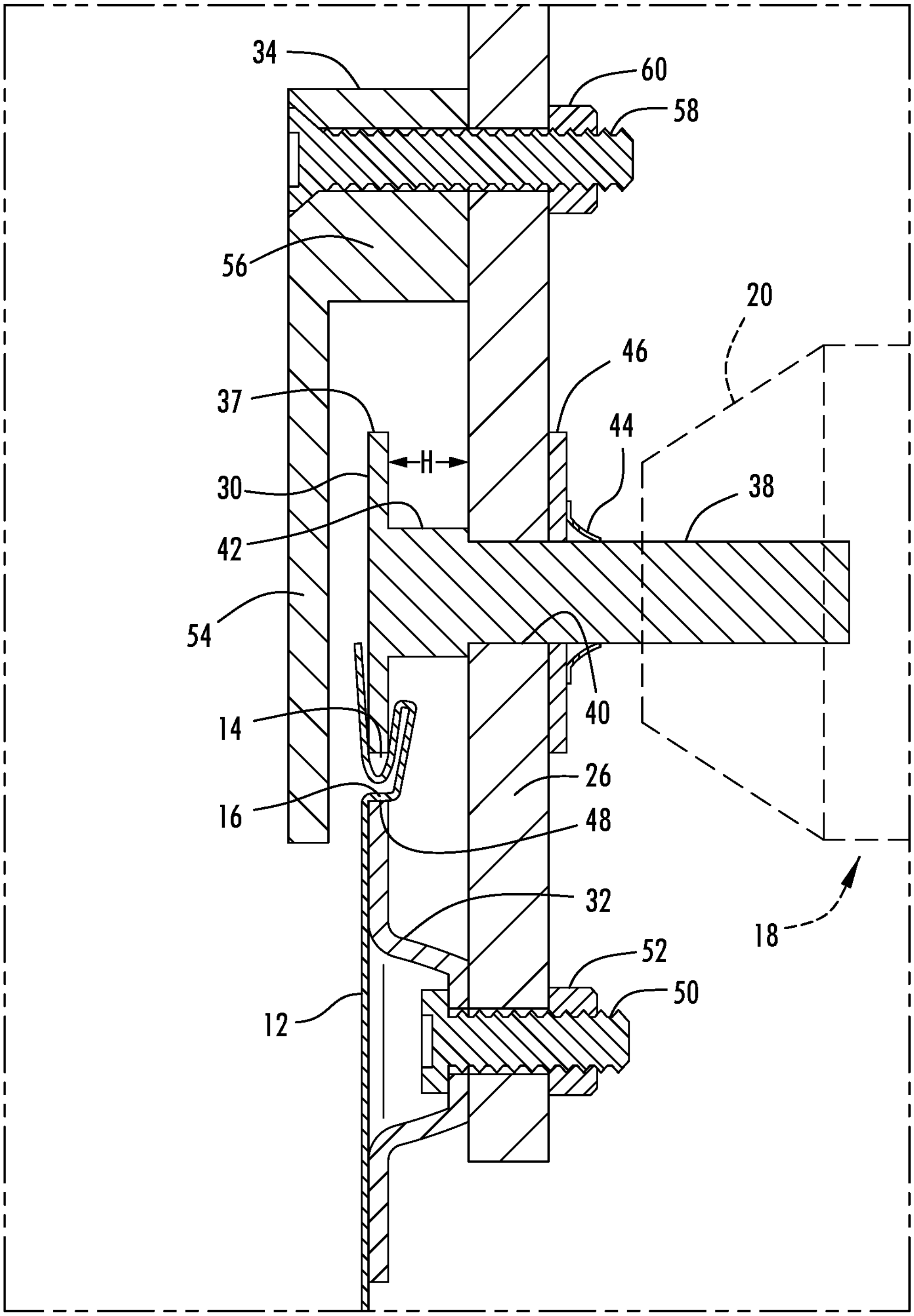
FIG. 7 is a cross-section detail view of the tool shown of the present disclosure in a second stage of engagement with the work piece shown in FIG. 6 taken along the line of VII-VII.

Referring now to FIGS. 5-7, the operation of the tool 10 is illustrated as the tool system including the tool 10 and the powered driver 18. In a first stage of engagement as illustrated in FIG. 5, the spreader wheel 30 is placed into position against a work piece 12, for example, at the closed mouth 15 of a Pittsburgh lock seam channel 14. In one implementation, the tool 10 may be held by the handle 28 at an angle with the guide 32 out of line with the end of the work piece 12, allowing the spreader wheel 30 to be placed into contact with the lock seam channel 14. The guard 34, being mounted to the frame 26 for free rotation relative to the frame 26, hangs vertically under the influence of gravity when the tool 10 is held at an angle where the work piece 12 is oriented vertically with the lock seam channel 14 at the top edge. The tool 10 may be rotated so that the guide 32 hooks under the base 16 of the lock seam channel 14 and draws the spreader wheel 30 further into the lock seam channel 14. This rotational operation is not intended to be limiting, and other alternatives are contemplated to be within the scope of the present disclosure. In one alternative, such as where the lock opening operation occurs away from an end of the work piece 12, the tool 10 may be held vertically and the spreader wheel 30 being forced directly into the lock seam channel 14, relying on the available displacement of the spreader wheel 30 along the shaft 38 to allow the guide 32 clearance to engage under the base 16 of the lock seam channel 14 as the spreader wheel 30 is being inserted into the lock seam channel 14.

In a second stage of engagement as illustrated in FIG. 6, the tool 10 is disposed with the spreader wheel 30 in the lock seam channel 14 and the guard 34 engaged at the base 16 of the lock seam channel 14. This second stage of engagement can be achieved in one example by rotating the tool 10 relative to the work piece 12 from the angled orientation as illustrated in FIG. 5 to the vertical orientation illustrated in FIG. 6. The tool 10 in FIG. 6 has also advanced down the length of the lock seam channel 14. The tool 10 can be advanced along the length of the length of the lock seam channel 14 by rotating the spreader wheel 30 disposed in the lock seam channel 14. Rotation of the spreader wheel 30 in one direction will advance the tool 10 in a first direction along the lock seam channel 14 and rotation of the spreader wheel 30 in the opposite direction will advance the tool 10 in the opposite direction along the lock seam channel 14. In the example, the spreader wheel 30 is rotated by rotating the shaft 38, for example with the shaft 38 engaged in the chuck 20 of a powered driver 18, as the handle 28 is held by the user to maintain the frame 26 in position relative to the work piece 12. The guide 32 engaged under the base 16 of the lock seam channel 14 acts to maintain the tool 10 in the proper position as it advances along the lock seam channel 14. FIG. 7 illustrates a cross-sectional detailed view of the tool 10 in engagement with the work piece 12, where the peripheral edge of the spreader wheel 30 is disposed between the walls of a Pittsburgh lock seam channel 14 with the guide 32 engaged at the base 16 of the lock seam channel 14.

A method for operating the described tool system 1 for opening a Pittsburgh lock seam channel 14 in a ductwork component, where the ductwork component has a mouth 15 at a first end and a base 16 opposite the mouth 15 can include the following operations. First, the peripheral edge 37 of the spreader wheel 30 can be placed in contact with the mouth 15 of the Pittsburgh lock seam channel 14. The frame 26 can then be rotated relative to the lock seam channel 14 to engage the retaining edge 48 of the guide 32 against the base 16 of the lock seam channel 14. The method involves applying rotation to the shaft 38 coupled to the spreader wheel 30, and advancing the tool 10 along the Pittsburgh lock seam channel 14.

The tool system 1 including the tool 10 and the powered driver 18 have been described in an exemplary manner and other alternatives and modifications are contemplated to be within the scope of the present disclosure. For example, the tool system 1 is described with the tool 10 being removably mountable to the powered driver 18 via a chuck 20 of the powered driver 18. In an alternative, the tool and a power source may be fabricated as an integrated unit as a battery-powered, motorized unit. In another alternative, the power source may be manually operated, such as via a hand-crank that couples directly or indirectly to the shaft 38. The tool 10 has been depicted in a direct drive arrangement with the spreader wheel 30 being directly mounted to and driven by the shaft 38. In other alternatives, there may additional intermediate components connecting the spreader wheel 30 with the driving power source, such as via gears, belts, or the like.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about," "substantially" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount. Alternatively, typical geometric dimensioning and tolerancing standards or practices may be recognized within the technical field when interpreting numbers, percentages, ratios, or other values stated herein.

Further, it should be understood that any directions or reference frames in the preceding description are merely relative directions or movements. For example, the terms "upper," "lower," "right," "left," "rear," "front," "vertical," "horizontal," "inboard," "outboard" and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A tool for opening a Pittsburgh lock seam channel formed in a ductwork component, the tool comprising:
  a frame;
  a spreader wheel supported on a first side of the frame for rotation relative thereto; the spreader wheel being coupled to a shaft for imparting rotational motion to the spreader wheel;
  the spreader wheel having a peripheral edge configured to be inserted a depth into a mouth of the lock seam channel; and
  a guide fixedly supported on the first side of the frame; the guide being spaced apart from the spreader wheel; the guide having a retaining edge configured to engage against a base of the lock seam channel to maintain the spreader wheel at the depth in the lock seam channel,
  wherein the guide is a guide wheel, and where the retaining edge is an outer periphery of the guide wheel configured to slide along the base of the lock seam channel.

2. The tool of claim 1, further comprising a handle extending from the frame.

3. The tool of claim 1, wherein the frame comprises a plate, a first aperture formed as a through-hole in the plate; the shaft extending through the plate.

4. The tool of claim 3, further comprising a shaft retainer retaining the shaft in the first aperture.

5. The tool of claim 4, wherein the first aperture has a first diameter, the shaft has a second diameter smaller than the first diameter, and wherein the shaft comprises a shoulder; the shoulder having a third diameter greater than the first diameter; the shoulder having a height along a length of the shaft, the shoulder maintaining a separation distance between the peripheral edge of the spreader wheel and the frame.

6. The tool of claim 5, wherein the shaft retainer is disposed on the shaft at a distance from the shoulder, wherein the distance between the shoulder and the shaft retainer along the length of the shaft is greater than a thickness of the plate.

7. The tool of claim 1, wherein the outer periphery of the guide wheel is spaced from the frame a distance equal to the height of the shoulder.

8. The tool of claim 1, wherein the outer periphery of the guide wheel comprises a material having a Rockwell hardness value greater than 70 HRB.

9. The tool of claim 1, further comprising a guard with a plate portion and a base portion, the base portion supported on and extending from the first side of the frame, and the plate portion coupled with the base portion and pivotable relative to the frame between a raised position that allows the plate portion to move over geometry of the ductwork component and a lowered position to extend over the spreader wheel opposite the frame.

10. A tool system for opening a Pittsburgh lock seam channel formed in a ductwork component, the tool system comprising:
  a tool comprising:
    a frame;
    a spreader wheel supported on a first side of the frame for rotation relative thereto; the spreader wheel being coupled to a shaft for imparting rotational motion to the spreader wheel; the spreader wheel having a peripheral edge configured to be inserted a depth into a mouth of the lock seam channel; and
    a guide fixedly supported on the first side of the frame; the guide having a retaining edge and being spaced apart from the spreader wheel at a distance to engage the retaining edge with a base of the lock seam channel and maintain the spreader wheel at the depth in the lock seam channel,
    wherein the guide is a guide wheel, and where the retaining edge is an outer periphery of the guide wheel configured to slide along the base of the lock seam channel; and
  a powered driver comprising:
    a motor in electronic communication with a power source; and
    wherein the motor is coupled to the shaft for driving rotation of the spreader wheel.

11. The tool system of claim 10, wherein the powered driver further comprises a chuck for removably coupling the motor to the shaft.

12. The tool system of claim 10, wherein the powered driver further comprises a battery, the battery in electronic communication with the motor.

13. The tool system of claim 10, wherein the powered driver further comprises a variable speed controller for selectively controlling the speed of the spreader wheel.

14. A tool for opening a Pittsburgh lock seam channel formed in a ductwork component, the tool comprising:
  a frame;
  a spreader wheel supported on a first side of the frame for rotation relative thereto; the spreader wheel being coupled to a shaft for imparting rotational motion to the spreader wheel; the spreader wheel having a peripheral edge configured to be inserted a depth into a mouth of the lock seam channel;
  a guide fixedly supported on the first side of the frame; the guide being spaced apart from the spreader wheel; the guide having a retaining edge configured to engage against a base of the lock seam channel to maintain the spreader wheel at the depth in the lock seam channel; and
  a guard with a plate portion and a base portion, the base portion supported on and extending from the first side of the frame, and the plate portion coupled with the base portion and pivotable relative to the frame between a raised position that allows the plate portion to move over geometry of the ductwork component and a lowered position to extend over the spreader wheel opposite the frame.

15. The tool of claim 14, further comprising a handle extending from the frame.

16. The tool of claim 14, wherein the frame comprises a plate, a first aperture formed as a through-hole in the plate; the shaft extending through the plate.

17. The tool of claim 16, further comprising a shaft retainer retaining the shaft in the first aperture.

18. The tool of claim 17, wherein the first aperture has a first diameter, the shaft has a second diameter smaller than the first diameter, and wherein the shaft comprises a shoulder; the shoulder having a third diameter greater than the first diameter; the shoulder having a height along a length of the shaft, the shoulder maintaining a separation distance between the peripheral edge of the spreader wheel and the frame.

19. The tool of claim 18, wherein the shaft retainer is disposed on the shaft at a distance from the shoulder, wherein the distance between the shoulder and the shaft retainer along the length of the shaft is greater than a thickness of the plate.

* * * * *